United States Patent [19]

Coates

[11] Patent Number: 4,521,531

[45] Date of Patent: Jun. 4, 1985

[54] CATALYST FOR ANTHRAQUINONE HYDROGEN PEROXIDE PROCESS

[75] Inventor: John S. Coates, Chesapeake City, Md.

[73] Assignee: E. I. Du Pont de Nemours and Company, Wilmington, Del.

[21] Appl. No.: 523,190

[22] Filed: Aug. 15, 1983

[51] Int. Cl.$^3$ .......................... B01J 29/06; B01J 29/12
[52] U.S. Cl. .................................... 502/242; 423/588; 502/262
[58] Field of Search ............................... 502/242, 262

[56] References Cited

U.S. PATENT DOCUMENTS 4,240,933  12/1980  Copelin ............................... 502/242

Primary Examiner—Gregory A. Heller
Assistant Examiner—Wayne A. Langel

[57] ABSTRACT

A palladium-on-silica catalyst for the anthraquinone-hydroquinone method of preparing hydrogen peroxide is prepared by adding acid solutions of a palladium compound and of an additive metal salt to an aqueous slurry of silica particles, lowering the pH of the slurry to about 0.8–1.0, then incrementally raising the pH of the slurry to 2.3–2.7, to 3.8–4.2, then to 6.8–7.2, and then reducing the palladium compound to palladium metal.

2 Claims, No Drawings

CATALYST FOR ANTHRAQUINONE HYDROGEN PEROXIDE PROCESS

TECHNICAL FIELD

This invention relates to an improved catalyst for the anthraquinone-hydroquinone method of preparing hydrogen peroxide. It is more particularly directed to a catalyst which is composed of palladium metal on a silica support.

BACKGROUND OF THE INVENTION

The anthraquinone-hydroquinone process for preparing hydrogen peroxide is well known and widely used. In this process, an alkylanthraquinone is catalytically hydrogenated to the corresponding hydroquinone, which is then oxidized to regenerate the anthraquinone and simultaneously produce hydrogen peroxide.

Palladium on a silica support is a good catalyst for that process because of the low surface activity of silica, although there have been reports of early failures of this type of catalyst due to the palladium not adhering to its support as well as it should.

Copelin, in his U.S. Pat. No. 4,240,933, discloses a palladium-on-silica catalyst in which adhesion of the palladium to its silica support is enhanced by incorporating into the catalyst a compound of zirconium, thorium, hafnium, cerium, titanium or aluminum.

It has now been found that a Copelin type of catalyst can itself be improved with respect to adhesion of the palladium to its support if the catalyst is prepared by the process of this invention. The catalysts thus produced also have excellent filterability.

DETAILED DESCRIPTION OF THE INVENTION

The silica used as a support for the catalysts of the invention is a particulate amorphous dried silica gel. Such a silica is available in the marketplace. A type preferred for use is Davison Grade D-56 or D-57, sold by Davison Specialty Chemcial Co. of Baltimore, Md.

The particle size distribution of this silica is an important factor in obtaining the beneficial effects of the invention. This distribution must be such that at least 95% by weight of the particles are retained on a USS No. 325 screen, which, as used here, means that at least 95% by weight of the particles are larger than about 44 microns. In addition, substantially all the particles will pass through a USS No. 60 screen, which, as used here, means that virtually no particles are larger than about 250 microns. The particles have a mean particle size of 90–110 microns, preferably about 100 microns, as measured by an instrument sold by Leeds and Northrup Co., of New Wales, Pa., and called "Microtrak."

This particle size distribution can be obtained by screening, air classification, elutriation, or by any combination of these methods.

When the proper size distribution has been obtained, a slurry of the silica in water is prepared. Demineralized water is preferred because it minimizes introduction of extraneous substances into the system. As with particle size distribution, the silica content of this slurry is important and must be within the range 20–30%, preferably 25–28% by weight, to obtain the beneficial effects of the invention.

To this slurry are then added a solution in acid of a water-soluble palladium compound and a solution in acid of an additive water-soluble salt of zirconium, thorium, hafnium, cerium, titanium or aluminum. Zirconium salts are preferred.

Illustrative of palladium compounds which can be used are the nitrate, the sulfate, chloropallidic acid, sodium chloropallidate, and the halides, especially the chloride. Palladium chloride is preferred.

Illustrative of the additive salts which can be used are the nitrates, the oxynitrates, the sulfates, the halides (especially the chlorides) and the oxyhalides (especially the oxychlorides). Oxynitrates are preferred.

The solutions are in concentrated or near-concentrated nitric acid for the palladium compound and concentrated or near-concentrated hydrochloric acid for the additive salt, and are prepared so that they contain 0.5–3% by weight of the palladium and 1–3% by weight of additive salt.

These acid solutions are added to the slurry, separately or together, with stirring. The amounts used are calculated to give, on the silica, a palladium metal concentration of 0.1–2% by weight and an additive salt concentration (measured as the oxide) of 0.025–0.5% by weight. The specific amounts of solutions to be used are easily calculated using the principles of stoichiometry, keeping in mind that virtually all of the palladium compound and additive salt is ultimately bonded to the silica particles.

The pH of the slurry at this point is about 1.5. That value is then brought to about 0.8–1.0 by adding concentrated nitric acid, with stirring.

The pH is then raised to 2.3–2.7, preferably about 2.5, with an aqueous saturated solution of sodium carbonate, and the slurry is brought to a temperature of 65°–75° C., preferably about 70° C., with stirring, and is held at that temperature for the rest of the preparative procedure.

After the pH of the slurry has been brought to 2.3–2.7, it is raised slowly to 3.8–4.2, preferably about 4.0, by the dropwise addition of the sodium carbonate solution. At this stage, the pH tends to drift downwardly somewhat. If this happens, the pH should be held within the range 3.8–4.2 by the addition of a few drops of sodium carbonate solution. The slurry is held within that range for 5–25 minutes, preferably about 20 minutes, with stirring.

The pH of the slurry is then slowly raised to 6.8–7.2, preferably about 7.0, with the sodium carbonate solution, and is held in that range for 5–15 minutes, preferably about 10 minutes, with stirring.

At this point, the palladium is present on the silica particles in compound form. This compound is reduced to palladium metal with a reducing agent such as formaldehyde, hydrogen or an alkali metal formate. Formaldehyde as a 37% aqueous solution is preferred. This is done by adding enough reducing agent to the slurry to reduce the palladium compound to palladium metal. The actual amount added can be calculated in each case according to the principles of stoichiometry. With formaldehyde, a two-fold excess over the stoichiometric amount is preferred. The slurry is then held at a pH of 6.8–7.2 with stirring, for 5–20 minutes, preferably 15 minutes, to complete the reduction.

At the end of this holding period, the palladium-on-silica particles are separated from the liquid by filtration, centrifugation or decantation, are washed free of residual salts with water, and then dried.

The catalyst thus produced can be used in any of the well-known anthraquinone-hydroquinone processes, as described for example in U.S. Pat. Nos. 2,657,980 or 2,940,833.

EXAMPLE

In the following, all parts are by weight unless otherwise indicated.

(1) 110.9 parts of Davison Grade 56 dried silica gel were slurried in about 1000 parts of demineralized water. The slurry was stirred gently for about 5 minutes and then allowed to settle for about 7 minutes. The water was withdrawn to the solid-liquid interface, and the procedure then repeated four times. The resulting silica had a particle size distribution such that 96.9% of the particles were larger than about 44 microns and no particles were larger than about 250 microns.

(2) A solution was prepared containing 25 parts of $PdCl_2$, 150 parts of demineralized water and 25 parts of concentrated hydrochloric acid. The solution was stirred and boiled for 10 minutes, and then made up to 1000 parts by volume with demineralized water.

(3) The silica gel prepared in (1) was slurried in about 300 parts of demineralized water. To it were then quickly added, with stirring, 72 parts (volume) of the solution of (2) and 20 parts (volume) of an aqueous solution of zirconium oxynitrate containing 1.25% of zirconium (calculated as $ZrO_2$). The pH of the resulting slurry was 1.4.

The pH of the slurry was then brought to 0.8 by addition of concentrated nitric acid, then raised to 2.5 by the addition of a saturated solution of $Na_2CO_3$. The temperature of the slurry was then raised to about 70° C. and was held at that temperature for the rest of the preparative procedure.

The pH of the slurry was then raised to 4.0 by addition of the $Na_2CO_3$ solution and was held there for 20 minutes.

The slurry was then raised to pH 7.0 by addition of the $Na_2CO_3$ solution and was held there for 10 minutes.

To the slurry were then added 10 parts (volume) of a 37% aqueous solution of formaldehyde. The slurry was then held at pH 7.0 for 16 minutes.

The silica particles were then separated from the slurry by filtration, washed with 600 parts of demineralized water three times, and then dried at 140° C. under a vacuum of about 100 mm Hg to give a palladium-on-silica catalyst containing 0.93% of palladium metal.

I claim:

1. A process for preparing a palladium-on-silica catalyst, the process comprising
   (a) preparing an aqueous slurry of 20–30% by weight of amorphous particulate silica, the particles having an average particle size of 90–110 microns, at least 95% by weight of the particles being larger than about 44 microns and substantially no particles being larger than about 250 microns;
   (b) adding to the slurry of (a) enough of a solution of a water-soluble palladium salt in acid to give the particulate silica a palladium content of 0.1–2% by weight, and enough of a solution of an additive water-soluble salt of zirconium, thorium, hafnium, cerium, titanium or aluminum in acid to give the particulate silica an additive salt content (measured as the oxide) of 0.025–0.5% by weight;
   (c) bringing the pH of the slurry of (b) to about 0.8–1.0;
   (d) bringing the pH of the slurry of (c) to about 2.3–2.7 and the temperature to 65°–75° C.;
   (e) bringing the pH of the slurry of (d) to about 3.8–4.2 and holding it there for 5–25 minutes;
   (f) bringing the pH of the slurry of (e) to about 6.8–7.2 and holding it there for 5–15 minutes;
   (g) reducing the palladium salt thus deposited on the silica to palladium metal;
   and then
   (h) freeing the slurry of (g) of residual salts and then separating the catalyst from the slurry.

2. The process of claim 1 in which the additive salt in (b) is of zirconium.

* * * * *